United States Patent

O'Neill et al.

[11] Patent Number: 5,575,145
[45] Date of Patent: Nov. 19, 1996

[54] GAS TURBINE REPAIR

[75] Inventors: Brian P. O'Neill, Bakersfield; Tommy A. Eveland, Fellows, both of Calif.

[73] Assignee: Chevron U.S.A. Inc., Richmond, Calif.

[21] Appl. No.: 332,835

[22] Filed: Nov. 1, 1994

[51] Int. Cl.⁶ .................................................... F02C 7/00
[52] U.S. Cl. ........................................ 60/39.02; 29/889.1
[58] Field of Search ............................. 60/39.02, 39.161, 60/39.31, 39.75; 416/198 A, 220 R; 29/889.1, 889.2, 889.21

[56] References Cited

U.S. PATENT DOCUMENTS

| | | | |
|---|---|---|---|
| Re. 33,954 | 6/1992 | Honda et al. | 416/196 R |
| 3,601,414 | 8/1971 | Veroinpatti . | |
| 4,030,288 | 6/1977 | Davis et al. | 60/39.161 |
| 4,285,108 | 8/1981 | Arrigoni | 29/889.1 |
| 4,466,785 | 8/1984 | Biswas . | |
| 4,536,127 | 8/1985 | Rossmann et al. . | |
| 4,537,024 | 8/1985 | Grosjean . | |
| 4,586,225 | 5/1986 | Bouiller et al. | 29/889.2 |
| 4,611,464 | 9/1986 | Hetzer et al. | 60/39.161 |
| 4,685,286 | 8/1987 | Hetzer et al. | 60/39.02 |
| 4,867,639 | 9/1989 | Strangman . | |
| 4,874,290 | 10/1989 | Cang et al. . | |
| 4,914,794 | 4/1990 | Strangman . | |
| 4,934,140 | 6/1990 | Dennison et al. | 60/226.1 |
| 5,064,727 | 11/1991 | Naik et al. . | |
| 5,160,243 | 11/1992 | Herzner et al. | 416/220 R |
| 5,220,784 | 6/1993 | Wilcox | 60/39.31 |
| 5,267,397 | 12/1993 | Wilcox | 29/889.2 |
| 5,307,623 | 5/1994 | Antuna et al. | 60/226.1 |

FOREIGN PATENT DOCUMENTS 2233261  1/1991  United Kingdom .................. 29/889.1

OTHER PUBLICATIONS

Hsu, L. L., "Materials for Clearance Control in Gas Turbine Rotating Seals" Turbomachinery Technology Seminar 1992, Caterpillar Solar Turbines product brochure.
Novinski, E. R., "The Design of Thermal Sprayed Abradable Seal Coatings for Gas Turbine Engines" Proceedings of the Fourth National Thermal Spray Conference, Pittsburgh, PA, May 4–10, 1991.

Primary Examiner—Timothy S. Thorpe
Attorney, Agent, or Firm—Burns, Doane, Swecker & Mathis L.L.P.

[57] ABSTRACT

A method for in-field improvement or repair of a stationary gas turbine is carried out by successive removal of the gas turbine discs including its multiplicity of blades (buckets) from the common drive shaft. The overlying ring of tip shoes (shroud) and gas feed nozzles (stationary buckets) are similarly sequentially removed. Each disc is axially and circumferentially index marked with respect to the common drive shaft prior to removal of a portion of the drive shaft and substitution of a dummy drive shaft. The dummy shaft in turn is similarly indexed to the turbine disc index marks. Such marking assures that the turbine discs may then be reassembled to the common drive shaft so that no field rebalancing of the common drive shaft, and its assembled air compressor stages, is required for vibration control. The tip shoes, including the labyrinth knife edge, are then replaced by recoated shoes for control of erosion resistance and progressive abradability of the edges to accommodate centrifugal and thermal expansion of the blade tips. Deposition of the abradable material on the blade tips or erosion of the blades is avoided by reducing the clearance between the tip shoe edges and the blade tips with such progressive hardness of the abradable material on the tip shoes. Such reduction greatly increases efficiency of the engine by enhance of power out put and reduced fuel consumption.

4 Claims, 4 Drawing Sheets

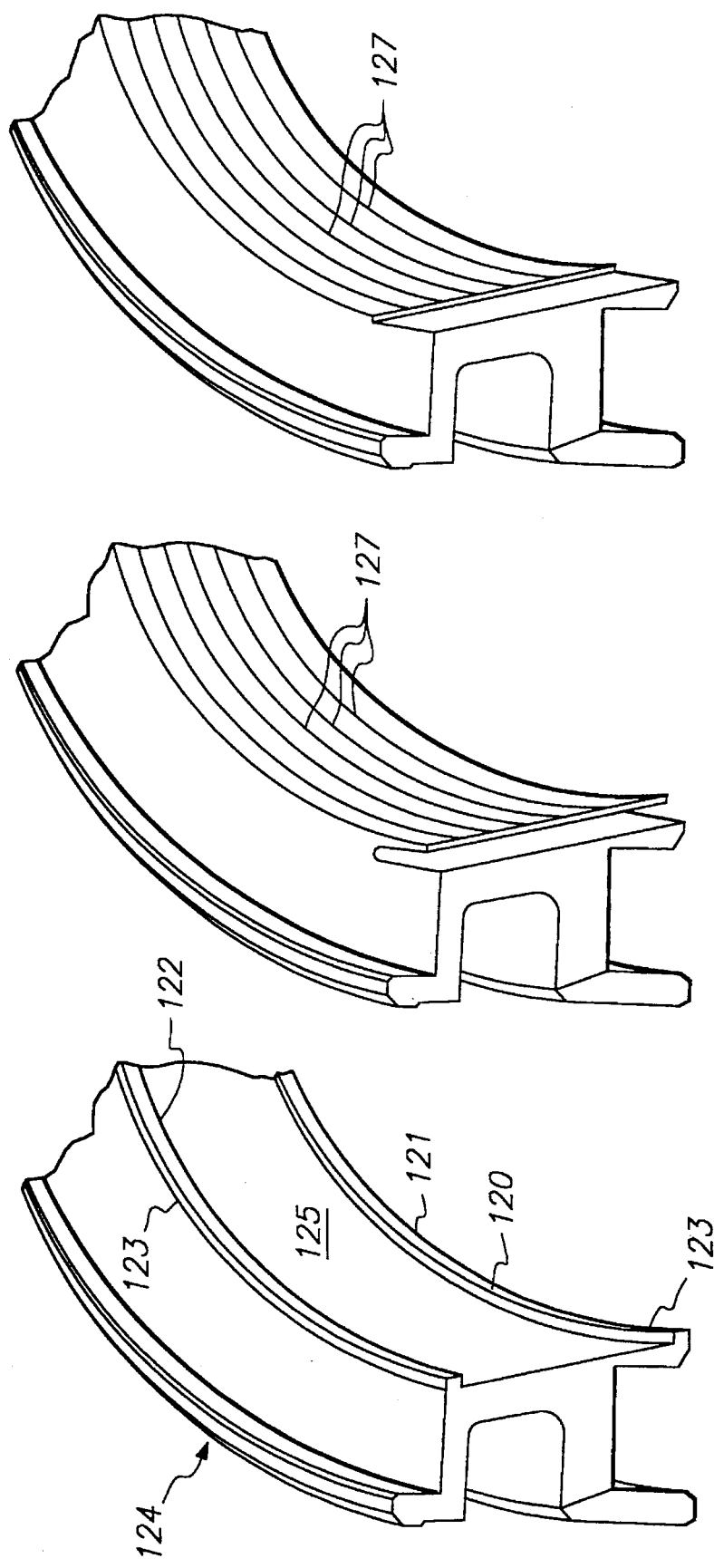

GAS TURBINE REPAIR

The present invention relates to hot gas turbine engines. More particularly, it relates to a method of field repairing, restoring or improving clearance between the outer tip ends of the hot gas stage turbine blades and the surrounding tip shoes to reduce substantially by-passing of hot gases around the ends of the turbine blades so that full power is extracted from such gases passing through the blades of several turbine discs. The method is particularly directed to a method of disassembly and reassembly of only the hot gas section of a gas turbine, without removing the entire turbine package from its stationary position or from its normally horizontal operating work position.

BACKGROUND OF THE INVENTION

Hot gas turbines have been widely used since their inception and first introduction approximately fifty years ago. In particular, they are found in many stationary applications where a continuous and reliable source of power is required, such as to generate of electrical power at remote locations, to pump gas or petroleum at high volume for extended periods of times, including many months, or even years. They also find many applications in transportation such as jet engines, marine propulsion, and tractor trailer combinations or big rigs. They vary in size from several thousand kilowatt hours per day, as in oil field operations, to generate electrical pumping power, or for gas injection and the like tip to many megawatts as in electric power generation and distribution. Although hot gas turbines are highly efficient overall, and relatively economical to operate, they range in cost from $500,000 to a few millions dollars, for modestly sized units, such as those that generate a few hundred kilowatts per day. Larger stationary hot gas turbine units, generating several hundred thousand kilowatt hours per day may cost from several million dollars up to several tens of millions of dollars.

It has long been known that the efficiency of such hot gas turbines is highly dependent upon full utilization of power generated by combustion of hydrocarbon liquids or gas with high pressured air generated by the air compressor section of a gas turbine engine. In its general configuration, a hot gas turbine comprises an air compressor section having a multiplicity of air compressor stages, that compress air to several hundred pounds per square inch, as it successively passes through the several compressor stages. The compressor stages are driven as a unit by a single common drive shaft, that extends through a combustion zone where hot gas is generated by the compressed air and fuel to drive the turbine section at the other end of the common drive shaft. The hot gas section is made tip of a plurality of hot gas stages each of which includes a turbine blade disc directly mounted on the common drive shaft. Power from the drive shaft is delivered to either one, or both ends, through suitable gearing, to drive any rotatable load, such as an electrical generator, an auxiliary pump, or the like.

While it has been known for a number of years that the efficiency of a hot gas turbine can be improved if clearance between the tips of the rotating blades on each turbine disc and the surrounding tip shoes can be reduced to a minimum so as to prevent hot, high pressured gases from bypassing each set of turbine blades by flow around the outer edges or tips of the blades. Unfortunately, for greatest efficiency, the rotor blades must be operated at high temperatures and high speeds that cause thermal and centrifugal forces that radially expand such turbine blades. Additionally, gravity, work loads and vibration forces acting on the turbine discs tend to cause the blade tips to "carve" or erode away portions of the surrounding tip shoes. In particular, the lower portion of a ring of the surrounding tip shoes, as viewed from the center line of the rotating common drive shaft may permit the blade tips to cut a non-circular path to form such an oval track over an arc of from a few degrees to a hundred degrees or more of the circumference.

Because of these changes in path of the blade tips in going from cold, or ambient, conditions to normally high operating temperatures of 900° to 1850° F. and at high speeds, clearance, or "gaps," between the blade tips and the tip shoes can vary widely around the circumferential path. To avoid potential damage to the disc blades, or possible destruction of the turbine hot stage, and even ballistic destruction of the casing or anything external around its circular path, we have found that factory or overhaul gaping is frequently too wide to achieve ideal or "rated" clearance so that no possible contact will occur between the two surfaces. And although abradable materials have been known, both for coating the ends of the turbine blades and the tip shoes, such materials have generally been used only on the air compressor stages which are not subjected to temperature changes of several hundred degrees, as compared to the hot stage turbine blades and tip shoes. Furthermore, where such abradable material has been added to either the blade tips or the tip shoes, the clearance is normally set so that little or no abrasion occurs. This appears to be due to a fear that such abraded material from the first or second hot stage discs may damage or plug the nozzles of a subsequent turbine stage.

Accordingly, little or no attempt seems to have been made to adjust the clearances between the turbine blades and tip shoe after the turbine is installed and operating. Thus, the only alternatives to operation at less than rated power, has been to keep running at the same low-efficiency, or to rent a replacement turbine, or to shut-down and ship the entire engine to an overhaul, or factory repair facility. Furthermore, correction of the gaping has not always assured that such an overhaul will in fact increase the power output of the installed turbine. The costs of shutting down or renting a substitute engine, and the cost of shipping and repair of the turbine can frequently exceed 100,000 dollars to several hundred thousand dollars. Where the gas turbine is located in a remote location, it is of course even more costly and more time consuming to have the engine packaged, and sent to be overhauled. Hence, there has long been a need for a field repair or overhaul procedure for improving the hot gas section of a gas turbine. However, there are other reasons which appear to have prevented people from attempting such field overhaul. These relate to a fear of possible injury of people or equipment, if any of the hot gas stages fail mechanically. A particular danger in this regard is that in factory assembly or overhaul, it has been considered essential to dynamically rebalance the common drive shaft, including both the air compressor assembly and the hot gas assembly. Since each of these assemblies is made up of a multiplicity of discs and their multiplicity of blades, such initial balancing, or subsequent rebalancing present a complex vibration problem. That problem relates to the axial spacing of and tile two assemblies from each other and their wide range of speeds, as well as the flexibility of the common drive shaft.

The length of tile drive shaft and tile separation of such rotating masses on the drive shaft requires careful dynamic balancing of the rotating components as a unit, at up to their maximum operating speeds. Such balancing is to avoid serious damage of the hot gas turbine blades due to vibration at any speeds over which the common drive shaft may operate. Since the same drive shaft also is coupled to a rotatable load either at a single end or at both ends of the drive shaft, any rotational vibrations of the drive shaft present an exceedingly difficult problem to handle.

For the foregoing reasons it will be understood that although there have been great incentives to develop a field reliable method, or procedure, for overhauling the hot gas section of a gas turbine engine, such need has not been answered prior to our invention. In carrying out our invention, we have devised methods, apparatus, and materials, that permit such economic rehabilitation of a stationary, or a transport, gas turbine engine without danger of modifying the dynamic balance of a turbine drive shaft during such repair or overhaul including all of its various components at any location, world wide. At the same time such overhaul or rehabilitation of the hot gas section is performed without removal of the complete gas turbine engine, from its normal outer package or its interconnections with its rotatable load. Accordingly, repair and installation of modified, and more effective, tip shoes, including abradable materials substantially reduce clearance between the tip shoes and the turbine blade tips is now possible and thereby substantially improves the power output and overall efficiency of the gas turbine engine. At the same time, prolonged down time of the turbine installation, is significantly reduced to a period of time to not more than a few hours, to a day or two. Thus overhaul, for complete disassembly, and assembly, including replacement of parts, and re-assembly for return to service, are all performed with minimum danger of damage to the turbine or personnel in the vicinity of the turbine.

SUMMARY OF THE INVENTION

The present invention is particularly characterized by the procedural steps whereby the hot gas section of the turbine is disassembled and reassembled to carry out an in-field method of rehabilitating or rebuilding the tip shoes so that less clearance is required between the tip shoes and the blade tips. This is additionally made possible by tailoring the abradable material on the face of the tip shoes to assure that it is readily removable to a desired gap during installation of the tip shoes. The abradable material must not only be highly resistant to heat, but also readily abrades by friction contact that may occur if thermal expansion of the turbine blade during start-up, or speed excursions, including normal vibration of the blade tips, as their path changes in diameter. Further, such tip shoe abradable material, if rubbed or worn off, must additionally readily exhaust through any subsequent nozzle stages, without damage or plugging.

In accordance with a :first aspect of the present invention, our method of on-site disassembly and reassembly of only the hot gas section of the gas turbine engine is in part made possible by the conventional construction of such turbine engines. As now marketed and used in generating power at a substantially constant speed over a period of many thousands of hours, such disassembly and reassembly is readily accomplished without removing the engine from its normal horizontal operating position because access to the hot gas stage is readily available by removal of the exhaust gas diffuser housing. Where initial construction of the turbine does not readily permit such access to the several hot stages, a one-time conversion of the exhaust diffuser housing may be readily effected without disturbing any of the rotating elements by a turbine mechanic. Because the apex of the conical form of the turbine housing around the hot section is near the combustion chamber, the last stage of the hot gas section is readily opened. Thus, assembly and disassembly of the hot stages permits access around the full circumference of the drive shaft and along the full length of the hot gas section.

With such exhaust gas diffuser open, it is to be noted that the hot gas section includes a plurality of hot gas stages, in which the assembly from the last stage to the first is in the following order for each such stage and includes 1) a turbine disc includes a multiplicity of turbine blades that are interlocked around the periphery of the turbine disc, and a hub that interlocks with the drive shaft and the adjacent turbine discs, 2) a plurality of tip shoe each of which covers an arcuate segments surrounding the circumference of the turbine blades and each has a surface that closely overlies the full circumferential path of the blade tip ends to minimize flow of gas around the outer ends of said blades and 3) means for supporting a plurality of stationary gas nozzles, (some in the form of turbine blades) for directing a high pressure, combustion gas stream against the next adjacent set of turbine blades after passing through the previous turbine stage.

After removing the exhaust gas diffuser housing, at least the lower periphery of the whole hot gas section is supported, as a single unit, so that each turbine disc, and its surrounding tip shoe segments and nozzles, so as to maintain normal, horizontal alignment of the full section with the common drive shaft, during subsequent disassembly.

The next essential step is to index mark the spacial position of each turbine disc relative to its axial and circumferential position on said drive shaft. Such index marks in part assure that reassembly of the discs and drive shaft are not displaced either radially or axially with respect to each other. This is the first highly effective step to avoid need to rebalance the entire rotating assembly. Then, at least a rearwardly extending portion of the drive shaft, on which the said hot turbine stages are assembled as a unit, is threadably disconnected and withdrawn without rotation between the turbine discs and the balance of the drive shaft.

A dummy drive shaft that replicates all of the radial and axial dimensions of the removed section of the drive shaft, except for the hexagonal drive head, is prepared as a substitute. Alternatively, the hex head of the original drive shaft may be modified by substituting an internal socket for the external hexagonal head. The dummy drive shaft section then supports the hot gas stages when substituted by insertion through the said rearwardly extending hot gas stages previously mounted on the common drive shaft.

The dummy drive shaft now permits removal of the elements of each hot stage be slidable moving of the bore of the hubs of each turbine disc over the dummy drive shaft. The similar threaded end secures the dummy drive shaft to the forwardly extending portion of the common drive shaft 16 and the two sections are preferably torqued together to the same extent as the original drive shaft connection between common shaft 16 and section 17.

The circumferential and axial positions of each turbine disc relative to its assembled orientation on the dummy shaft is then registered or indexed on the substituted dummy drive shaft. Then successively, each of the hot stage elements is removed from the turbine drive shaft over the open end of the dummy shaft. The elements are removed in the following order:

1) the turbine disc, 2) the ring of tip shoes and 3) the corresponding nozzle ring.

Before disassembly of at least the first and second hot stages of the plurality of hot stages, the spacial gap between the turbine blade tips and the opposed faces of each tip shoe segment is measured and recorded at a plurality of spaced apart locations on each tip shoe face. For each tip shoe face surrounding the turbine blade tip paths, preferably measurements are recorded near their opposite ends and near the center.

Re-assembly of the multiplicity of hot stages is in the reverse order of the above-noted steps. Each turbine disc is oriented around and along the dummy shaft by registering its index-marks to the previously recorded marks on both the shaft and the turbine discs. However, the opposed faces of each replacement tip shoe segment includes an abradable surface coating having a Mohs scale hardness of not less than about 60 and not greater than about 80. Further, the abradable surface spans the axial width of the turbine blades and has a thickness, or depth, extending radially toward the turbine blade tip path that is at least 0.060." Desirably, but not necessarily, this results in zero gap between the tip shoe face and "standard" or cold length of the turbine blades. Thus, if such spacing overlaps all clearance space between the shoe tip face coating and the opposed blade tips, the excess material is radially abraded on each tip shoe face, as by scraping, or grinding, portions of each tip shoe face to obtain an average clearance of not more than about 0.040 inch around the arc of each tip shoe and around the full circumference of each stage of the turbine blade tips.

After reassembly of the hot gas section, such assembly is again supported under its lower periphery, independent of the dummy drive shaft. The dummy drive shaft is unthreaded from the turbine drive shaft to permit replacement of the original rearwardly extending portion of the common drive shaft. Again, each index marker on the original common drive shaft section is realigned with the index markers on each turbine disc, both radially and axially so that the reassembled discs on the turbine drive shaft do not require dynamic rebalancing prior to operation of the re-assembled gas turbine.

Further objects and advantages of the present invention will become apparent from the following detailed description of the preferred method to carry out the necessary steps of assembly and reassembly of only the hot gas section of a gas turbine to restore or enhance the efficiency of both fuel consumption and power output and without rebalancing the rotary assembly, as described and shown in the accompanying drawings, which form an integral part of the application.

BRIEF DESCRIPTION OF THE DRAWINGS

FIGS. 4A, 4B and 4C show three perspective views of successive modifications of the errosion resistant and abradable surface of a tip shoe in accordance with this invention for reassembly of the tip shoe rings covering the blade tips of at least the first two stage of a hot gas section.

PREFERRED EMBODIMENTS OF THE INVENTION

Figure 1:
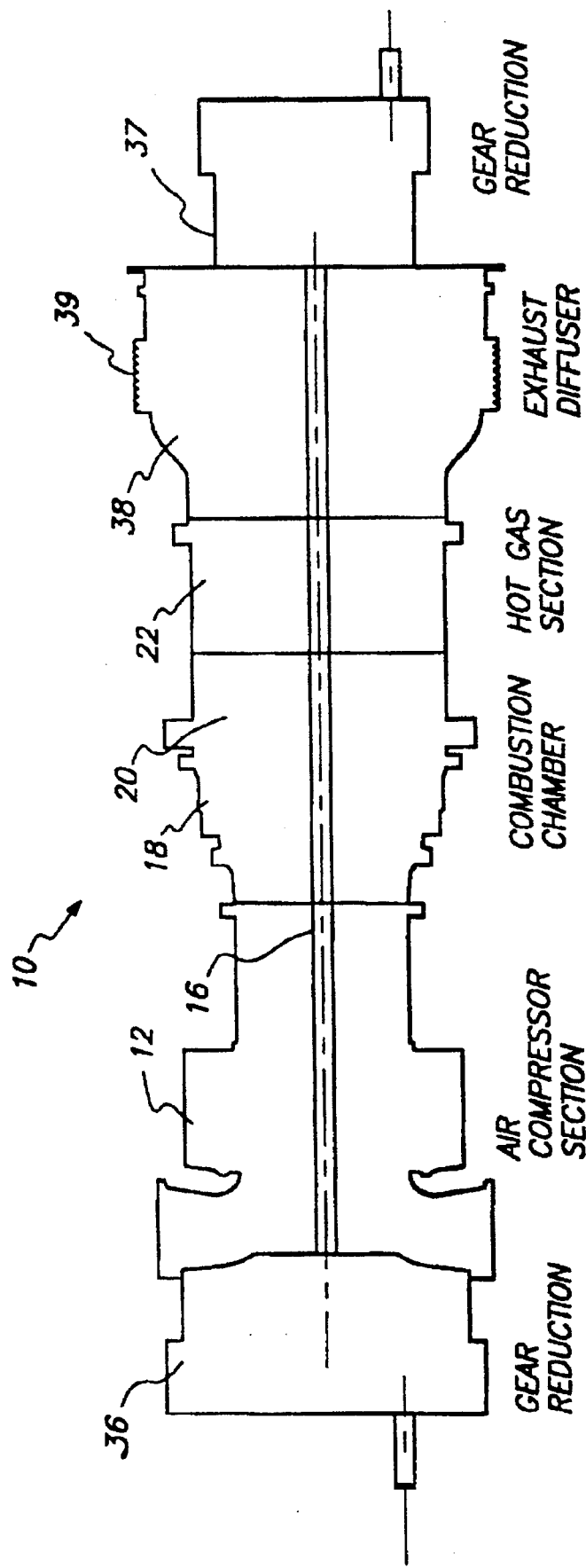
FIG. 1 is an outline of a gas turbine engine showing the operative portions of an engine to which the present invention is applicable.

Referring now to FIG. 1, the method of the present invention is particularly directed to restoring or improving the efficiency of hot gas turbine engines 10. The primary elements or such a turbine engine are shown in a block diagram by FIG. 1, as used for power generation. Such engines are most useful at remote or undeveloped geographic locations to generate electrical power, or to pump oil or gas, or to drive similar rotatable loads. As shown, the primary component of engine 10 include an air compressor section 12 comprising a multiplicity of air compressor discs (not shown) rotatably mounted on common drive shaft 16 extending through a forward portion of turbine housing 18. Housing 18 also encloses a combustion chamber 20 wherein fuel oil, or gas, combines with compressed air generated by air compressor section 12 to supply hot gas to drive turbine discs forming hot gas section 22, similarly rotatably mounted on common drive shaft 16.

Figure 2:
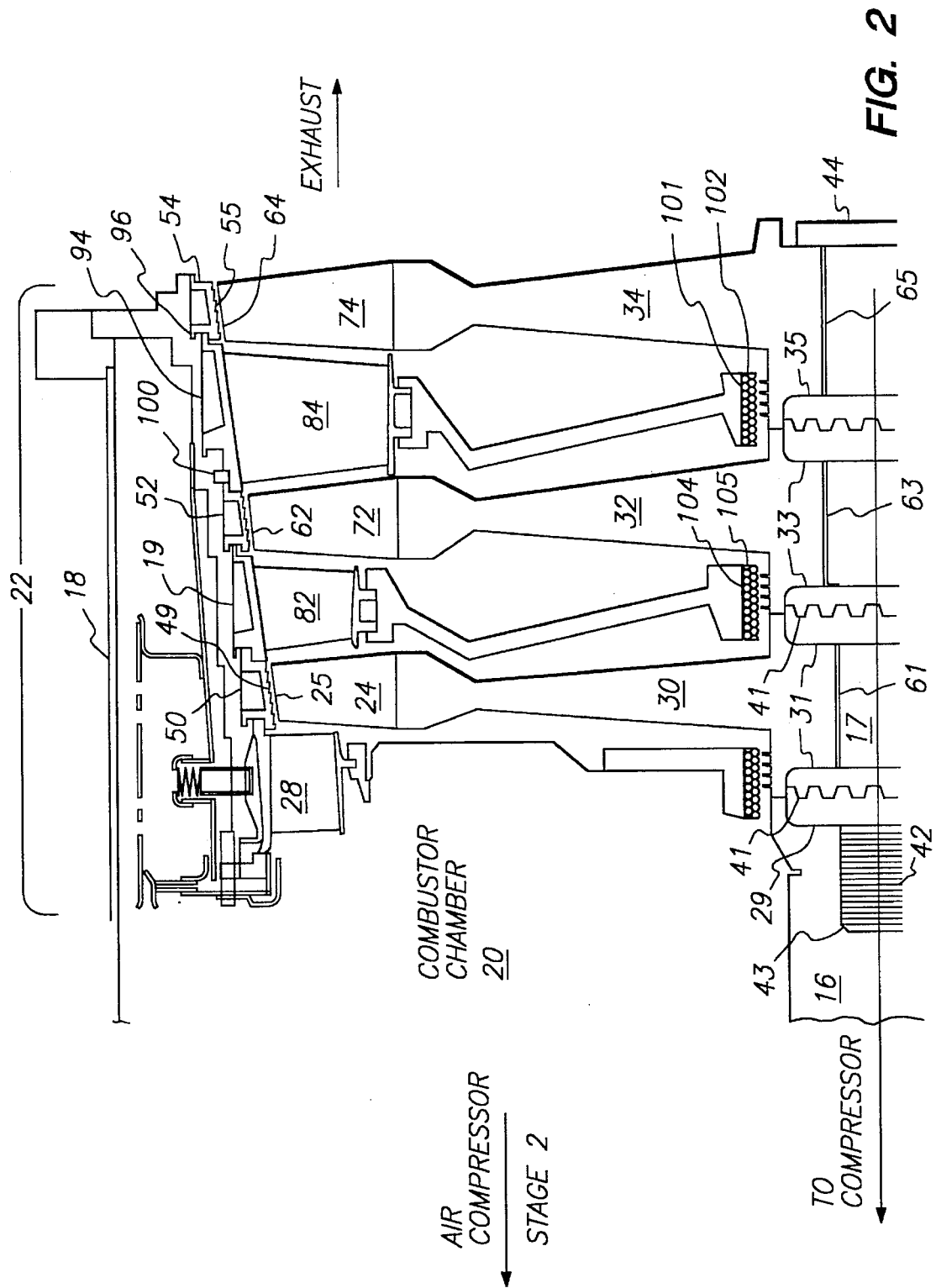
FIG. 2 is a partial cross sectional elevation view through the essential elements of the upper half of three stages of a hot gas section of a gas turbine, showing the sequential arrangement or turbine discs, tip shoes, and nozzle rings when assembled on a common drive shaft.
Figure 3:
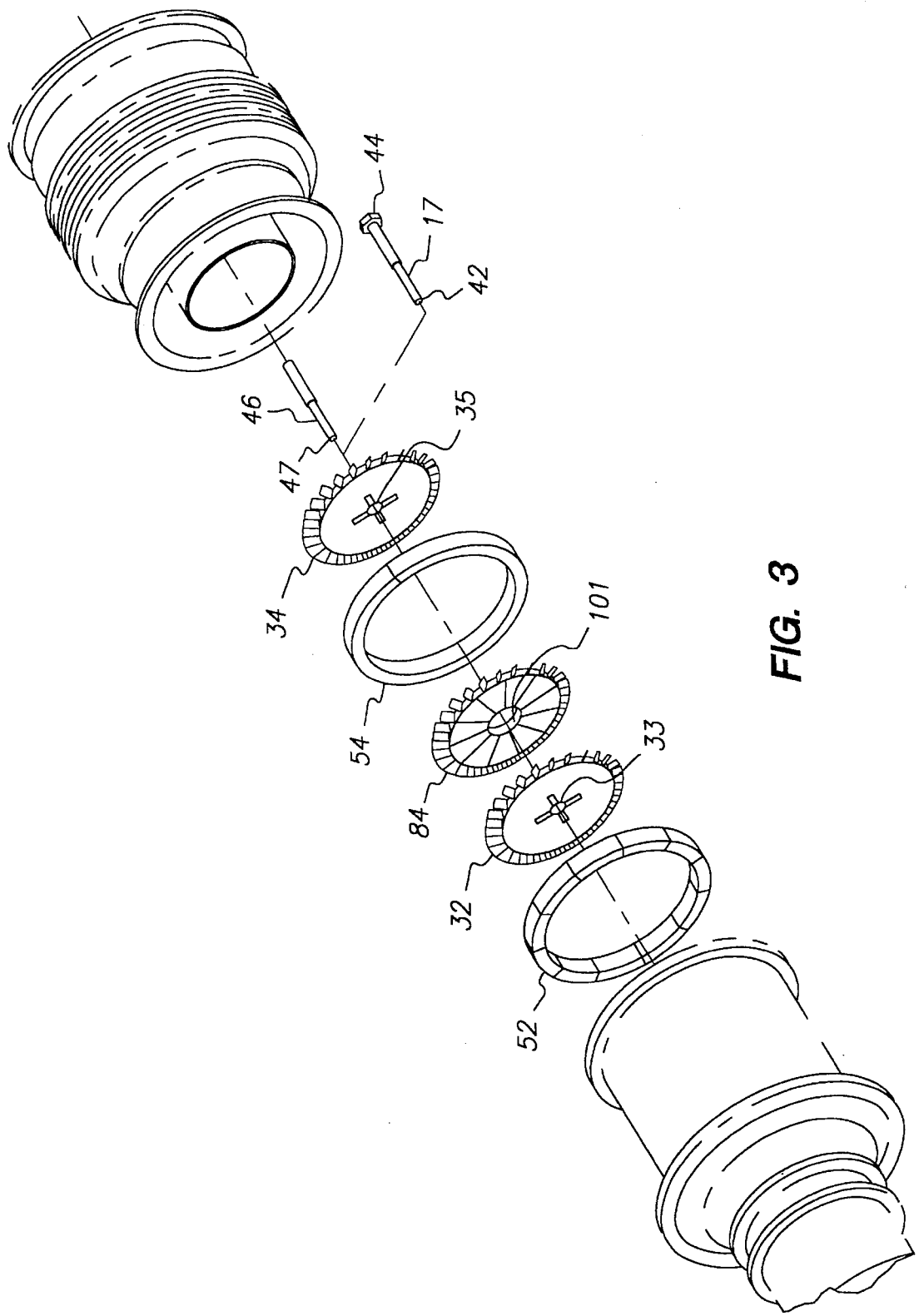
FIG. 3 is an exploded view of the tip shoe arrangements of the second and third hot gas sections in the order of their disassembly from the associated turbine discs and nozzles from the assembly shown in cross section by FIG. 2.

Hot gases from combustion chamber 20 are fed to turbine hot gas section 22 through a group of first stage feed nozzles 28 around first stage turbine blades 24 mounted on disc 30, best seen in FIG. 2. Disc 30, along with second stage disc 32 and third stage disc 34, jointly drive common drive shaft 16. Common drive shaft 16, in addition to driving compressor discs 14, directly rotates power load units, such as a generator or pump, through reduction gearing 36 or 37 at either, or both, ends, of engine housing 18. Hot gases exhaust from third stage disc 34 are collected and diffused either as exhaust gas, or for heat recovery, by flow into gas diffuses housing 38 and out of vent 39.

As noted above, because it has frequently been found that an engine is unable to achieve its ideal design or "rated" power to drive a given load, it has been necessary to tolerate less than optimum output, rather than incur the expense of renting a substitute gas turbine engine (frequently not available, or not economically feasible). Alternatively, total loss of use of the engine for many days or weeks may be necessary to complete such repairs or overhaul. Accordingly, there has long been a need for a method that permits in-field, or on-site, disassembly and repair to recover lost power required of such engines, namely by reducing the clearance space between the turbine blade tips 25, 62 and 64 and the arcuate faces 49 of the multiplicity of tip shoes 50, 52 and 54, surrounding the blade tips.

In accordance with the present invention, we have developed procedures that permits achieving such rated, or upgraded, performance of a gas turbine engine, such as engine 10, so that in-field disassembly and reassembly does not require removal of the complete engine assembly for shipment to an overhaul facilities. Rather, the steps of the present invention permit systematic removal of only the elements of hot gas turbine section 22, without requiring rebalancing of the drive assembly over its full dynamic range of drive shaft speeds.

Such in-field replacement of portions of hot gas section 22 must be carried out without requiring such dynamic rebalancing of the complete drive shaft assembly 16, including air compressor section 12. For this to be possible, it is essential that each of turbine discs 30, 32 and 34 be registered or indexed relative to each other and their precise axial and circumferential, or radial, positions on drive shaft 16. As will be apparent such registration eliminates the normally required rebalancing of the entire drive shaft assembly after disassembly and reassembly of the entire turbine engine. Additionally, we have found that removal of exhaust gas diffuses 38 readily exposes only the portion of the interior of engine housing 18 that substantially surrounds the three hot gas stages drive discs 30, 32 and 34. Most importantly, removal of diffuses 38 exposes a rearward portion of drive shaft 16 which is formed as a tubular member 17 that includes a threaded forward end 42 that couples portion 17 to similar threads 43 at the rear end of drive shaft 16. The opposite end of shaft 17 includes a hexagonal head 44 for rotating and axially compressing, or torquing, shaft section 17 to shaft 16. When shaft 17 is fully torqued, discs 30, 32, and 34 are bound together at their respective hubs 31, 33 and 35 to form a single rotating mass, or body, integrate with drive shaft assembly 16, and the multiplicity of similar discs forming air compressor 12. It will be noted that the diameter of shaft 17 is stepped so that forward end 42 is smaller. Hub 31 of disc 30 has a matching smaller bore 61 which extends through the forward portion of hub 33 of disc 32. The rearward diameter of shaft 17 has a larger diameter that matches bore 63 passing through the rearward portion of hub 33 and hub 35 of discs 34.

With exhaust gas diffuser 38 open, the first essential step of in-field repair for enhancement of the hot gas section is to index both the axial and radial positions of each turbine disc hub 31, 33 and 35 relative to drive shaft portion 17 and in turn section 17's radial position relative to the rest of common drive shaft 16. As best seen in FIG. 2, flanges 29, 31, 33 and 35 are formed with interlocking gear teeth or lands 41 around shaft 17. Before any disassembly of hot gas section 22, the assembled ends are each marked as to their junction points on the opposing and interlocking faces of hubs 31, 33 and 35, as well as their positions on portion 17 and main drive shaft 16.

The indexed junction marks are vital because they assure that upon reassembly into the same configuration, no radial or axial displacement of any of the rotating elements has occurred. Thus, when operating the engine over its normal operating ranges of speeds, temperatures and loads, the dynamic balance of the total drive shaft assembly will not change. Index markings of discs 30, 32, and 34 relative to drive shaft portion 17 may be made either before, or after, at least the lower half of the axial length of hot gas section 22 is externally supported by a sling either held by bracing, or jacks, (not shown) from below the full hot gas assembly or from above hot section 22 by suspension from a sling (not shown) supported by an overhead crane, or from the apex of a rigid tripod (not shown).

After suspension of hot gas section 22, threaded end 42 of drive shaft portion 17 is unscrewed from drive shaft 16 by rotation of hex head 44, preferably using a torque wrench. Additionally advantage may be taken of the fact that shaft 17 is generally annular so that its interior is tubular. This permits heating of the threaded connection by an electric heater element having an external diameter that allows insertion of the heater to a depth sufficient to thermally expand threads 42 to disconnect shaft 17 from shaft 16. Preferably, the torque between threads 42 and mating threads 43 of drive shaft 16 is recorded and used in reassembly of shafts 16 and 17.

If after removal of shaft section 17, no similar hot gas turbine section has been field-disassembled, a dummy shaft 46 must be fabricated. Such dummy shaft comprises a replica of shaft 17 so that shaft 46 including threads 47 has precisely the same step diameters over the same axial lengths as those forming shaft 17. These same lengths and diameters along the length of shaft 46 will thus be identical to shaft 17, but without a counterpart of hex head 44 (which would prevent axial movement of hub, or flanges, 3i, 33 or 35 along shaft 46.)

Dummy shaft 46, so constructed, is then inserted through disc hubs 31, 33 and 35 and threaded to shaft 16. Preferably, threads 47 of dummy shaft 46 are torqued to the same value as threads 42 when coupled to threads 43 of drive shaft 16. In the same manner as on shaft section 17, dummy shaft 46 is indexed to each of the three turbine discs. This procedure is also essential to maintain the integrity of all the rotating elements of the hot gas section namely the original drive shaft, the air-compressor discs and hot gas turbine discs. During such substitution of shaft 46 for shaft 17, it is essential that no relative rotation occurs between any of hot stage discs 30, 32 and 34 and common drive shaft 16.

Disassembly of the elements of each hot gas stage then begins by removing third stage turbine disc 34 by sliding hub 35 along and over the open end of dummy shaft 46. However, prior to such removal the gap between each blade tip 64 around the circumference of overlying tip shoe 54 is measured. Because third stage blades 74 normally operate at lower temperatures and pressures, due to conversion of hot gas energy to power in passing through the two preceding hot stages discs 30 and 32, tip shoe 54 may be a single circular hoop or ring, normally having a single narrow circumferential gap to permit insertion into step ring 96 around the inner surface of casing 18. Further, because of the less sever operating conditions, damage is generally less likely to be found on either blade tips 64 or face 55 of tip shoe 54. Accordingly, "gaping" (measuring the gap) between tip shoe 54 and the blade tip 64 is less likely to require change. However, to attain maximum improvement from third stage disc 34, the gaps should be recorded around the circumference of the blade tips to determine whether the circular path of the third stage blade tips has become oval shaped, so that if the amount of gap has increased, its clearance over such arc span can be accomodated.

After removing tip shoe ring 54, the assembly of third stage nozzles 84 may be removed as a unit. It will be noted that nozzles 84 are stationary relative to disc blades 72 and 74, but each nozzle has a configuration similar to those disc blades lying on either side of nozzles 84. The multiplicity of nozzles 84 are supported at their outer ends by hangers 94, also supported by turbine casing, or housing, 18. Hangers 94 are also held in place circumferentially by retainer ring 100. It will also be seen that the opposite ends 101 of nozzles 84 are sealed against flange 33 and 35 of discs 32 and 34 respectively by rotary seals 102. Seals 102 prevent gas from by-passing the lower ends of nozzles 84. The multiplicity of nozzles 84 are desirably removed as a group by an elastic belt (not shown) extending around their upper edges, as they are pulled rearwardly away from hanger 94.

Second stage turbine disc 32 and tip shoes 52 are exposed by removal of third stage nozzle ring 84. The gaps between tips 62 of turbine blade 72 and each of the plurality of tip shoe of segments 52 are measured and recorded. Preferably, such measurements are made adjacent both ends of the arcuate segment forming the tips shoe ring and at the center of each tip shoe. In general, eleven tip shoe segments 52, as in FIG. 2, cover the circumferential path of blade tips 62. After all gap measurements are completed tip shoes 52 are disengaged from step frame 19 of housing 18. Tip shoe segments 52 are locked circumferentially by locating pins that match a hole in the upper surface of each tip shoe (not shown). Hub 33 of turbine disc 32 is then free to slide over the open end of dummy shaft 46. Second stage nozzles 82 including hub end 104 and bearing 105 are released from frame 19 in the same manner as third stage nozzles 84.

With the ring of second stage nozzles 82 removed, first stage turbine disc 30 and tip shoes 50 are exposed. Again, the gaps between each of the several arcuate segments forming tip shoes 50 and tips 25 of blades 24 are measured. As with the second stage, the gaps at both ends and at the central portion of each tip shoe 50 are preferably recorded. Following such recording, tip shoes 50 are removed from around blade tips 24 by release from circular step frame 19 of housing 18. Turbine disc 30 is then free for removal by sliding hub 31 over the open end of dummy drive shaft 46. If desired, first stage nozzles 28 may then be removed for inspection, and if needed, repaired or replaced.

Based on knowledge that where all engine is not delivering its "rated" power, the gap spacing between each tip shoe and blade tips, is generally excessive. Such excessive clearance may be due either to there being no abradable material between the labyrinth edges of the tip shoes (e.g. edge 55 of tip shoe 54) or the tip shoes have inadequate abradable coating, as by erosion of such abradable material from the labyrinth edges. Excessive gaping, or spacing, may also be due either to blade tip damage or to partial destruction of the tip shoes after thermal or centrifugal expansion of the turbine blade tips that over expands the radial length of the turbine blades. Other causes for excess gaps developing may be due to gravity sag, bearing wear or excessive vibration developed by the rotating drive shaft assembly. Further, such excessive clearance may also be due to deliberate cautions as to initial spacing used to avoid any potential interference between the blade tips and the tip shoe faces. Other potential reasons for excessive gaping include improper installation of abradable surfaces material either on the blade tips or on the tip shoe faces, or the hardness and/or density of the abradable material, may cause failure in normal service. In practice, we have found that due to the unpredictable amount and nature of the resulting excess radial clearance between blade tips and the tip shoe, the abradable coating, requires close control of the width and thickness of the coating over the tip shoe surface as well as the support area for the coating on the metal base of the tip shoe. Additionally, the density and porosity of the abradable coating material as applied by properly relating the tip shoes is particularly effective to minimize hot gas loss through such gaps. Minimum gap around at least the first and second stage turbine blades is particularly effective to increase power output while at the same time reducing fuel consumption. Both are highly desirable. To this end, and prior to reassembly of the hot gas section, either new or repairable tip shoes are preferably prepared and coated in the following manner.

As shown in FIG. 4A, face 125 of each tip shoe 124 is milled or ground, to remove any previously present abradable and corrosion inhibiting material, so as to form a smooth cylindrical surface 125. Surface 125 has a reduced thickness which terminate at the edges in slots 120 and 122 adjacent rims 121 and 128, respectively. Together the slots and rims serve to anchor the abradable and erosion resistant material filling the space between tip shoe face 125 and the turbine blade such as tips 25 or 62 and if desired, tips 66. As noted before, such spray material is desirably a mixture of nickel-aluminum powder, or nickel, chromium alumina/ bentonite component powder. Most preferably, we have found that Metco 450-NS Nickel-alumina composite powder that is vaporized in a thermo spray gun using oxyacetylene is most satisfactory to provide both erosion resistance at the base of surface 125 and to form more porous abradable material of ridges or knife edges 122, as shown in FIG. 4B. Such choice of the two services is provided by reducing the temperature of the sprayed powder to form abradable edges 127. The total depth from edges 127 to the base surface of face 125 is preferably about 0.060 inches greater than the OEM set space between, for example, as in FIG. 2, blade edge 25 and the labyrinth edges 49 of tip shoe 50.

Such added depth is generally adequate to close the space between the edge 127 of tip shoe 124 to touch the turbine blade tips, at ambient and static conditions, unless the blade tips have been eroded, or ground, away. With such depth, as each tip shoes 50 is inserted into its locked position in hanger 19, sufficient abradable material is available so that it may be readily ground, or abraded away, as by emery cloth, or a portable grinder, to create a uniform gap clearance of about 0.040 inch between edges 122 of face 125 at all portions around the circumference of tips 25 or 62 of blades 24 or 82, as shown in FIG. 4C. Although a portion of this circular closure around discs 30 or 32 may exceed that optin-ram value over a few degrees of arc, (e.g., due to gravity deformation of drive shaft 16) the overall gap area for gas loss is substantially reduced. Thus, the total volume of hot gas flow driving blades 24 and 72 substantially decreases fuel consumption and increases power output. The abradable material preferably has a Rockwell hardness of from 40 to 80 so that said material will stand up under hot gas temperatures of up to about 1660° F., but the abradable material has a porosity such that only small shavings, or particles, are cut or abraded away from ridges 122 of tip shoes 50 by thermal or centrifugal growth, or expansion, of turbine blade tips 25, but without deposition, or blockage, of any of the down stream stages of the hot gas section, such as the second or third stage nozzles 82 and 84 or their turbine blades 62 and 64.

Using the specially rebuilt tip shoes in at least each of the first two hot gas stages, reassembly of the hot gas section is in the reverse order to those described above, for disassembly of the hot gas section. However at this stage of the overhaul process, the installation of each of turbine discs 30, 32 and 34 is in accordance with its respective registration, or index marking, with respect to the adjacent turbine discs and its axially and circumferential position on dummy drive shaft 47. These must be carefully observed and followed to avoid disturbance of the dynamic balance of the complete drive shaft assembly to avoid destructive vibration problems in reassembly of the turbine engine, without removal of the engine from its normal location.

After assembly of the hot gas section on dummy drive shaft 47, the dummy drive shaft is unthreaded from main drive shaft 16 and original drive shaft 17 is reinstalled with the same caution again being exercised to register correctly each index mark in the final assembly. Thus, the radial and axial positions of each rotatable element, namely, discs 30, 32 and 34, are interlocked by their hubs 31, 33 and 34 with shaft hubs 29 on drive shaft 16, including hex head 44 of hot gas stage shaft 17. Heating of the connecting threads 42 and 43 and by tightening shaft 17 to its original torques value assures that the full hot gas section 22 is completely reassembled without displacement of the engine from its initial work position.

Reassembly of exhaust gas diffuser to enclose section 22 completes reassembly of the engine for return to service.

Further changes and modifications of the present invention will occur to those skilled in the art of hot gas turbines from the foregoing description and drawing. All such changes, modifications or alterations covered by the attached claims are intended to be covered thereby.

We claim:

1. A method of on-site disassembly and reassembly of only the hot gas section of a gas turbine engine without removal of said engine from its normally horizontal operating position, and wherein said hot gas section extends rearwardly from an air compressor section and a combustion chamber intermediate said hot gas section and said air compressor section, said hot gas section comprising a plurality of adjacent hot gas stages, each of said stages including a turbine disc having a multiplicity of turbine blades interlocked around the periphery of said disc and tip shoe means closely overlying the circumferential path of the tip ends of said multiplicity of blades, said tip shoe means minimizing flow of hot gas from said combustion chamber to said turbine blade tips from flowing around the outer ends of said blades and means for supporting a plurality of stationary gas nozzles to directing high pressure hot gas streams against a multiplicity of turbine blades of the next adjacent hot stage, each of said hot stages being axially adjacent each other with said plurality of turbine discs being rotatably mounted on a common drive shaft of said engine, and wherein the forward portion of said drive shaft includes an air compressor section having a multiplicity of compressor stages for supplying combustion air to burn hydrocarbon fluids between said compressor and hot gas sections to generate high pressure gases to drive said hot gas stages, and at least one end of said drive shaft being connectable to a rotatable power train, and the rear portion of said drive shaft being enclosed within a gas diffuser housing for receiving exhaust gas that has successively passed through said plurality of hot stage discs, said method comprising the steps of:

A. removing the exhaust gas diffuser housing sufficiently to access at least the last hot gas stage of said plurality of turbine stages forming said hot gas section of said gas turbine B. supporting at least the lower periphery of said hot gas section as a single unit including each of said turbine digs, the surrounding tip shoe means and the down stream nozzles stages being in substantially their normal horizontal alignment on said common drive shaft by index marking the spacial position of each turbine disc relative to its position on said drive shaft, then threadably disconnecting and withdrawing at least a rearwardly extending portion of said drive shaft on which said hot stages are assembled as a unit without rotation between each of said turbine discs and its position on said common drive shaft C. substituting a dummy drive shaft section for said rearwardly extending drive shaft portion, said dummy shaft having substantially an identical outer diameter over the same length as the removed drive shaft portion to replicate said portion, including the threaded end portion thereof, except that the rearward end of said dummy drive shaft permits slidable passage of the hubs of said turbine discs thereover without rotation relative to the assembly of said dummy shaft to the forwardly extending portion of said common drive shaft, D. indexing the circumferential position of each turbine disc relative to the assembled orientation on said dummy shaft, E. them, successively removing each of said hot stage assemblies from said turbine engine by respectively sliding each turbine disc of each hot stage over the open end of said dummy shaft, said elements being removed in the following order; 1) each turbine disc, 2) the tip shoe means as a unit, and 3) the corresponding nozzle ring F. then re-assembling said multiplicity of hot stages in the reverse order of step E, wherein (a) each turbine disc is oriented around and along said dummy shaft by aligning the index marks previously recorded on said dummy shaft and said turbine discs, and (b) substituting for each original tip shoe segment a replacement tip shoe segment having an abradable surface coating overlying the turbine blade tips, each abradable coating having a Mohr scale hardness not less than about 40 and not greater than about 80 and a radial thickness or depth of said coating extending radially toward the turbine blade tips of at least 0.060" and then radially adjusting the clearance between said coating of said tip shoe surface and the radially opposed blade tips to obtain an average clearance of not more than about 0.040 inch around the circumference of said blade tips, and G. supporting the lower periphery of said hot gas section independent of said dummy drive shaft, then removing said dummy drive shaft and threadably reconnecting said rearwardly extending portion of said common drive shaft so that each of said index markers on said drive shaft is aligned with the respective index marker on said turbine disc whereby the reassembled discs on said turbine drive shaft do not require dynamic rebalancing of said common drive shaft prior to operation of the re-assembled gas turbine.

2. A method in accordance with claim 1 wherein the coating of the tip shoe abradable surface used in step (D) increases in hardness from about 40 at the surface adjacent to the turbine blades to about 80 at the base support for said tip shoe.

3. In the operation of a gas turbine engine wherein a common drive shaft assembly includes a hot gas section comprising a plurality of hot gas stages, each of which includes a turbine disc axially spaced apart from the other turbine discs along said drive shaft and an air compressor section axially spaced apart from said hot gas section having a multiplicity of axially adjacent air compressor discs, and a combustion chamber surrounding said drive shaft intermediate said hot gas and said air compressor sections, said common drive shaft extending beyond either one or both of said air compressor and hot gas sections of said engine for connection to rotary drive power means, or auxiliary means, or both, and wherein said turbine engine includes a removable exhaust gas diffuser housing extending beyond the last turbine discs of said hot gas section to expose a sufficiency of each turbine disc supported on a portion of said common drive shaft being independently removable from said hot gas section, a method for in-field restoring or improving the efficiency of the hot gas stage of said gas turbine without displacement or removal of said turbine engine from its normal operating position and without need to re-balance said common drive shaft assembly to avoid destructive vibration of said gas turbine engine operating at normal or ideal temperatures and rotary speeds, which comprises the steps of (a) index marking each of said hot gas turbine discs relative to its axial and circumferential position on said removable drive shaft portion;

(b) withdrawing said removable drive shaft portion from said common drive shaft through said plurality of turbine discs by unthreading the connection between said portion and said common drive shaft, (c) replacing said drive shaft section with a dummy drive shaft section, said dummy drive shaft being substantially identical to said drive shaft portion, including a threaded end for connection to said common drive shaft except that the rearward end of said dummy drive shaft having a diameter to permit the hubs of each said turbine disc to pass axially over said dummy drive shaft end, (d) index marking the circumferential and axial positions of each turbine disc on said dummy shaft, and measuring the space or gap between the tips of the turbine blades and the opposed tip shoe surfaces at a multiplicity of locations around the full circumference of said turbine blade tips, (e) then, successively removing each of said hot stage assemblies from said turbine engine by independently sliding the turbine disc over the rearward end of said dummy shaft, removing the associated tip shoe means as a unit, and followed by removal of the corresponding nozzle ring supplying hot gas to the related turbine disc, (f) re-assembling said multiplicity of hot stages in the reverse order of step (e) wherein each turbine disc is oriented around and along said dummy shaft by said index markings previously recorded on said dummy shaft and said turbine discs, and (g) after each turbine disk is replaced, substituting a modified tip shoe means for each of the plurality of original tip shoes around at least said first and second stage turbine discs, each of said modified tip shoe means including an abradable surface coating forming a plurality of labyrinth edges having a Mohr scale hardness not less than about 40 and not greater than about 80, and said labyrinth edges having a radial width toward the opposed turbine blade tips to substantially full the space therebetween, and the hardness of said labyrinth edges of said substituted tip shoes having maximum abradability at the outer end thereof and each shoe means having a maximum hardness at the support ends of said tip shoe to permit self adjustment of said space between the turbine disc tips and said labyrintive edges to minimize abrasion of said labyrinth edges to the maximum radial expansion of said turbine blade tips under operating conditions and without damage to said blade tips, and (h) unthreading the end of said dummy drive shaft from said common drive shaft, and threadably reconnecting said drive shaft portion to said common drive shaft so that each of said index markings on said discs and their index markings on said drive shaft portion may be torqued to said common drive shaft, whereby said drive shaft and the reassembled discs thereon do not require dynamic rebalancing of said common drive shaft prior to operation of the re-assembled gas turbine.

4. A method in accordance with claim 3 wherein prior to removal of said tip shoes from said hot stage assemblies in accordance with step G, measuring the space or gap between the tips of the turbine blade and the opposed tip shoe surfaces at a multiplicity of locations around the full circumference of said turbine blade tips, and radially adjusting the clearance between said tip shoe edges and the radially adjacent blade tips thereof by removing a portion of said labyrinths to obtain an average clearance of not more than about 0.040 inch around the circumference of said blade tips.

* * * * *